US008671158B2

(12) United States Patent
Vignisson et al.

(10) Patent No.: US 8,671,158 B2
(45) Date of Patent: Mar. 11, 2014

(54) METHOD AND APPARATUS FOR EDITING, FILTERING, RANKING AND APPROVING CONTENT

(75) Inventors: Vidar Vignisson, San Diego, CA (US);
Will Von Reis, Del Mar, CA (US);
Andrew Kreiling, Austin, TX (US)

(73) Assignee: Saban Digital Studios LLC, Los Angeles, CA (US)

( * ) Notice: Subject to any disclaimer, the term of this patent is extended or adjusted under 35 U.S.C. 154(b) by 0 days.

(21) Appl. No.: 13/459,022

(22) Filed: Apr. 27, 2012

(65) Prior Publication Data

US 2012/0216245 A1 Aug. 23, 2012

Related U.S. Application Data

(63) Continuation of application No. 12/395,605, filed on Feb. 27, 2009, now Pat. No. 8,171,107.

(60) Provisional application No. 61/033,288, filed on Mar. 3, 2008.

(51) Int. Cl.
*G06F 15/16* (2006.01)

(52) U.S. Cl.
USPC .......................................................... 709/217

(58) Field of Classification Search
USPC ............... 709/203, 217, 223, 224, 225; 726/1
See application file for complete search history.

(56) References Cited

U.S. PATENT DOCUMENTS

| 5,678,041 | A | 10/1997 | Baker et al. ............................. 1/1 |
| 6,539,430 | B1 * | 3/2003 | Humes ........................... 709/225 |
| 6,928,455 | B2 | 8/2005 | Dougu et al. ........................... 1/1 |
| 7,194,536 | B2 * | 3/2007 | Fellenstein et al. ............ 709/224 |
| 7,424,014 | B2 * | 9/2008 | Mattes et al. ................... 370/389 |
| 7,610,287 | B1 * | 10/2009 | Dean et al. ............................. 1/1 |
| 7,720,463 | B2 * | 5/2010 | Marsico ......................... 455/410 |
| 7,925,577 | B2 * | 4/2011 | Crosthwaite et al. ............ 705/38 |
| 8,224,950 | B2 * | 7/2012 | Humes ........................... 709/224 |
| 2001/0033274 | A1 | 10/2001 | Shastri et al. .................. 345/741 |
| 2002/0049806 | A1 | 4/2002 | Gatz et al. ...................... 709/203 |
| 2002/0049907 | A1 * | 4/2002 | Woods et al. .................. 713/182 |
| 2002/0095415 | A1 | 7/2002 | Walker et al. ...................... 707/9 |
| 2003/0105822 | A1 * | 6/2003 | Gusler et al. ................... 709/206 |
| 2003/0140152 | A1 * | 7/2003 | Creig Humes ................. 709/229 |
| 2003/0233447 | A1 * | 12/2003 | Fellenstein et al. ............ 709/224 |
| 2004/0003071 | A1 | 1/2004 | Mathew et al. ................ 709/223 |
| 2004/0006621 | A1 | 1/2004 | Bellinson et al. ............. 709/225 |
| 2004/0172552 | A1 * | 9/2004 | Boyles et al. .................. 713/200 |
| 2005/0074001 | A1 * | 4/2005 | Mattes et al. .................. 370/389 |
| 2005/0198319 | A1 | 9/2005 | Chan et al. ..................... 709/228 |

(Continued)

*Primary Examiner* — Sargon Nano
(74) *Attorney, Agent, or Firm* — Arent Fox LLP

(57) ABSTRACT

The system provides a method and apparatus for editing, filtering, ranking and approving content. In one embodiment, the system provides a browsing environment for children that routes all internet requests through a central server. A request to a blocked website is automatically forwarded to one of a plurality of editors who can then access the site and determine on a page or site basis as to whether the request is suitable for the browsing environment. The system includes a workflow management system that determines which of the plurality of editors will be assigned a link to review. Approved content is categorized by the age and gender of the users of the content. The approved content is also categorized as a resource or reference to assist in accomplishing homework assignments. Parents can receive updates and can manage the content remotely.

4 Claims, 5 Drawing Sheets

(56) References Cited

U.S. PATENT DOCUMENTS

| | | |
|---|---|---|
| 2006/0031870 A1 | 2/2006 | Jarman et al. .................. 725/25 |
| 2006/0041655 A1* | 2/2006 | Holloway et al. ............. 709/223 |
| 2006/0242294 A1 | 10/2006 | Damick et al. ................ 709/224 |
| 2007/0067794 A1* | 3/2007 | Russell et al. ................. 725/25 |
| 2007/0124785 A1* | 5/2007 | Marsico ....................... 725/105 |
| 2007/0271220 A1 | 11/2007 | Carter .............................. 707/2 |
| 2008/0320568 A1* | 12/2008 | Hawkins et al. .................. 726/5 |
| 2009/0204910 A1* | 8/2009 | Zhang ........................... 715/760 |
| 2009/0287705 A1 | 11/2009 | Schneider ........................ 707/9 |
| 2010/0114965 A1* | 5/2010 | Dean et al. .................... 707/784 |
| 2011/0179118 A1* | 7/2011 | Dean et al. .................... 709/204 |

\* cited by examiner

METHOD AND APPARATUS FOR EDITING, FILTERING, RANKING AND APPROVING CONTENT

CROSS REFERENCE TO RELATED APPLICATIONS

This application is a divisional of U.S. application Ser. No. 12/395,805, filed Feb. 27, 2009, the entire content of which is incorporated herein by reference. Also this application claims the benefit of U.S. Provisional Application No. 61/033,288, filed Mar. 3, 2008, which is herein incorporated by reference in its entirety.

BACKGROUND OF THE SYSTEM

1. Field of the Invention

The invention relates to reviewing content such as web sites to determine its suitability for a particular consumer and for editing, filtering, ranking and approving the content in whole or in part.

2. Background of the Invention

The ability to access information via networks such as the Internet has become an accepted part of everyday life. The ability to interact with digital knowledge sources is of such fundamental importance that parents and schools have encouraged computer literacy in children of younger and younger age. Accordingly, young children have regular and ongoing access to computers and in a typical home or school, to information networks such as the Internet.

This increased computer and Internet use by children creates a challenge for parents, who may wish to monitor or filter the information to which a child has access. Moreover, a parent may determine that a child should spend more time using a personal computing device for one thing (such as doing homework) and less time using it for other things (such as playing games). Unfortunately, a modern personal computing device typically does not provide a parent with the controls that would allow the parent to define a policy relating to how a child may use the personal computing device.

There have been some attempts to provide a children safe computing and browsing environment. In some cases, filtering software is provided that enables a parent to block certain web sites from access without a password. In theory, when the parent is surfing the web, the parent can disable the feature or supply the required password when blocked content is desired. The system may also include an ability to search for certain words and phrases and block websites that contain those phrases. The child is prevented from defeating the system due to lack of knowledge of the password.

A disadvantage of such systems is the inability to intelligently filter material. The banned websites are typically over or under-inclusive. A child may have access to potentially harmful material or may be denied access to safe and appropriate material. It also places a burden on the parents to maintain the filters and to modify them appropriately. For example, if the child is attempting to access a website that is blocked, the child needs the parent's assistance to provide permission for browsing that website.

BRIEF SUMMARY OF THE SYSTEM

The system provides a method and apparatus for editing, filtering, ranking and approving content. In one embodiment, the system provides a browsing environment for children that routes all internet requests through a central server. The server checks the URL of the request against a database of approved sites. If there is a match, the system permits access to the site. If there is no match, the website access is blocked and the child is notified. In one embodiment, the system can also notify the parents or update a history report each time a non-approved website is requested. The request to a blocked website is automatically forwarded to one of a plurality of editors who can then access the site and determine on a page or site basis as to whether the request is suitable for the browsing environment. The system includes a workflow management system that determines which of the plurality of editors will be assigned a link to review. Approved content is categorized by the age and gender of the users of the content. The approved content is also categorized as a resource or reference to assist in accomplishing homework assignments.

DETAILED DESCRIPTION OF THE SYSTEM

The present system provides a method and apparatus for managing, editing, ranking, filtering, and categorizing content on a network. In the following description, the system is described in connection with an embodiment that manages content to be accessed by children on a network. However, the system is not limited to this embodiment and has application to any situation where content is desired to be managed for a specific audience. The system may be implemented in a child-oriented computer such as is described in U.S. patent application Ser. No. 12/037,082 entitled "Child-Oriented Computer System" filed on Feb. 25, 2008 and incorporated by reference herein in its entirety.

Example Embodiment

Figure 1:
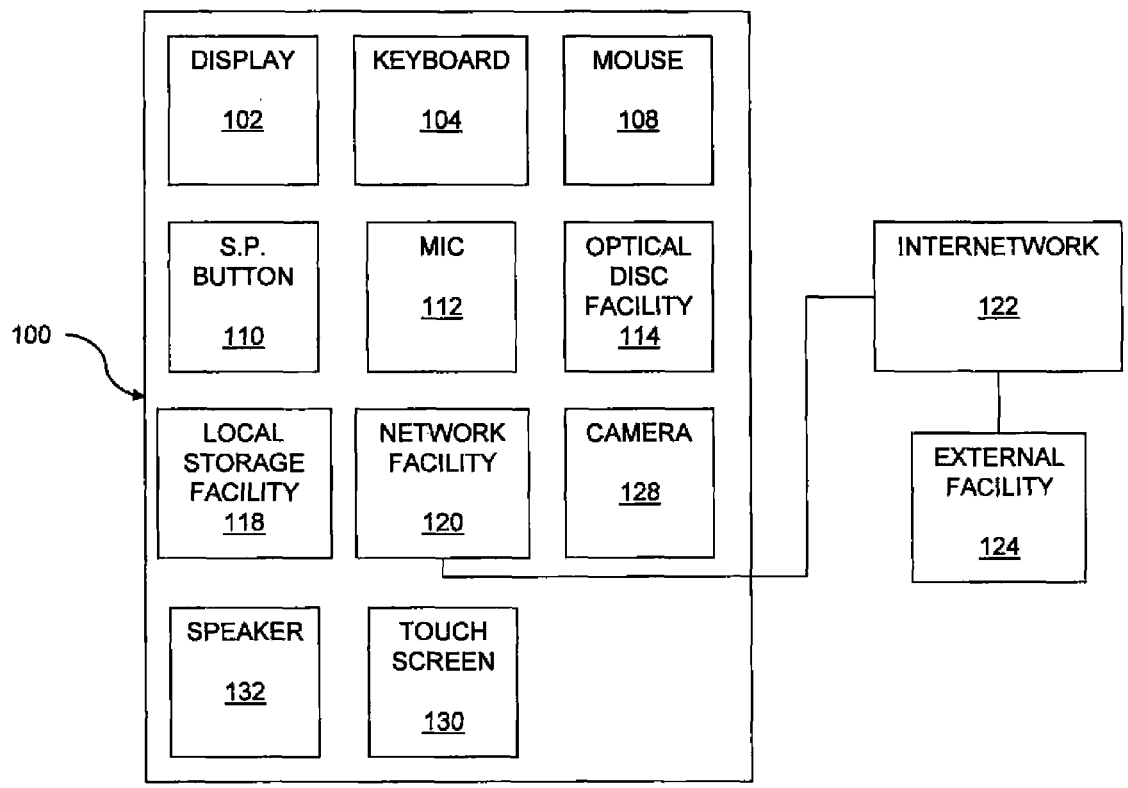
FIG. 1 is a block diagram of an example computer system in an embodiment of the system.

The system contemplates a user (in one embodiment a child) accessing a network using a computing facility of some type. Referring to FIG. 1, in some embodiments, a computing facility 100 may comprise a commercial, off-the-shelf (COTS) computing facility, such as and without limitation a personal computer (PC), a cell phone, a Sony PSP2, and the like. The COTS computing facility may run an operating system such as Linux or a variant thereof, a Microsoft Windows-brand operating system, Mac OS X, and so forth. In the preferred embodiment, the computing facility 100 may comprise a COTS PC.

In embodiments, the computing facility 100 according to the principles of the present invention may comprise the following elements: a display 102; a keyboard 104; a mouse 108; a special-purpose button 110; a microphone 112; a optical disc facility 114; a local storage facility 118; a network facility 120; a camera 128; a touch screen 130; a speaker 132; and so forth. The computing facility may be operatively coupled to a network 122, such as the Internet. The network 122 may, in turn, be operatively coupled to an external facility 124, which is described in detail hereinafter in reference to other figures.

In embodiments, the internal components of the computing facility 100 may include a primary motherboard. The motherboard may include a central processing unit (CPU); RAM memory (which may be the local storage facility 118), such as a RIMM chip, SRAM, DRAM, a BIOS chip; a PCI slot; an Accelerated Graphics Port; a ZIF socket; a disk controller, which may be directed at controlling a hard drive or floppy drive; an additional chipset; an expansion slot; a parallel port; a PS/2 port; a serial port; an ATX power connector; a fan; a battery; and so forth. The motherboard may be connected to an external power supply in order to receive power from a standard wall electrical outlet. Additional internal components may include a media drive (of which the optical disc facility 114 may be comprised) and/or ports, such as and without limitation a compact disc player/recorder, a digital video disc player/recorder, removable disk drives (e.g. a USB jump drive, memory card or the like). The internal components may connect with multimedia components, such as an audio speaker and/or the display 102 (which may comprise an LCD, plasma, CRT, LED, holographic, or other monitor or display device).

Example Software Embodiment

Figure 2:
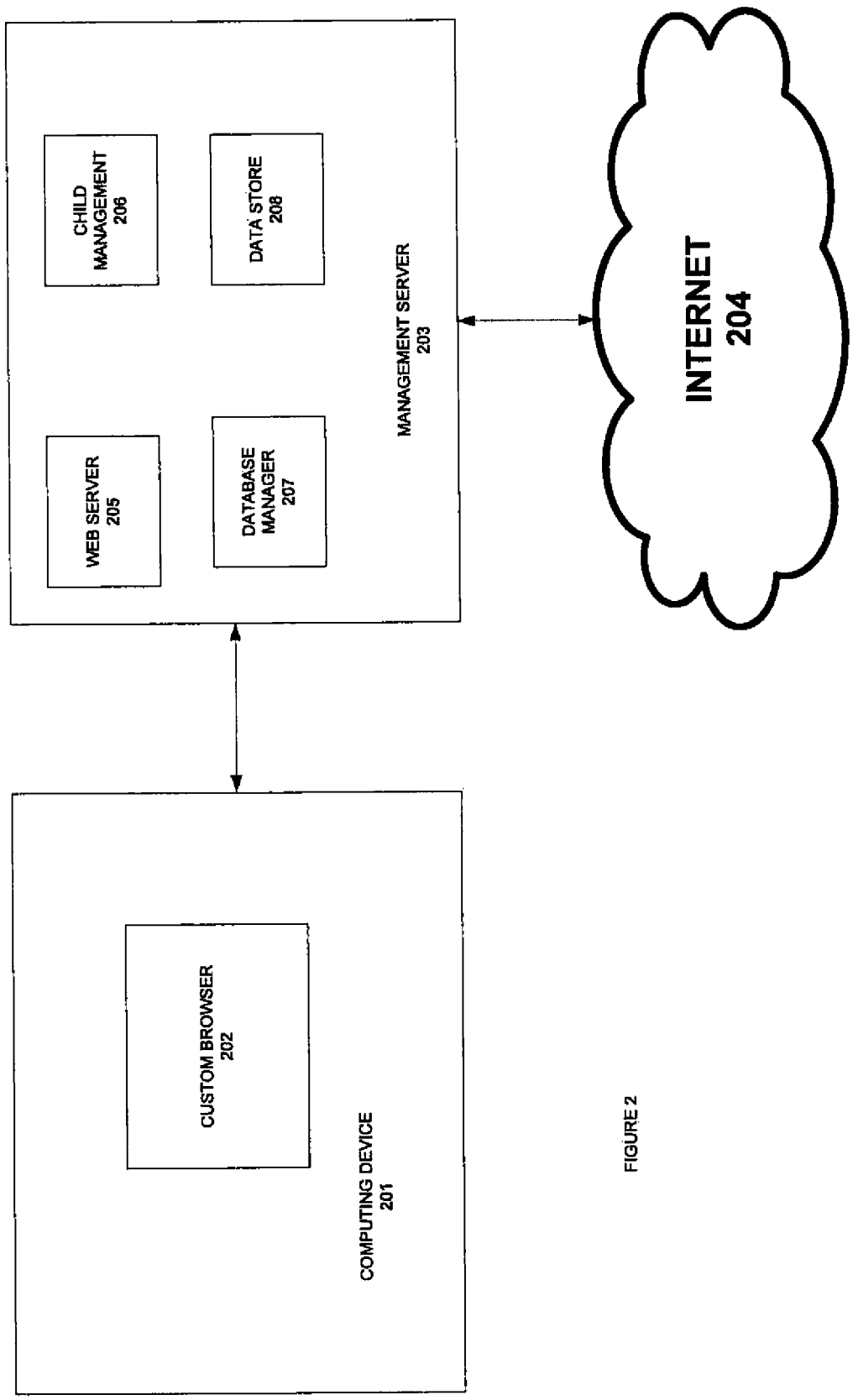
FIG. 2 is a block diagram of an example embodiment of a managed network experience.

In one embodiment the system uses a custom browser to provide the interface between the user and the Internet. The browser controls all requests and replies so that the user has a layer of protection between himself and the Internet. FIG. 2 illustrates an example implementation of a software embodiment of the child-oriented computing system. In this embodiment, the child-oriented computing system is provided by a piece of software downloaded from a management unit to a computing device wherein one or more children use the downloaded software when installed to browse content. In particular, the system may include a computer 201 that is used by the children to access the Internet. (The computer 201 may be any suitable computing device that is capable of accessing the Internet and may be the example embodiment described in FIG. 1). A typical browser (e.g. Internet Explorer, Netscape, Mozilla, etc.) is replaced with a custom browser 202 that includes browser functions such as searching, multi-media presentation, favourite lists, browsing, chatting, emailing, social networking functions, and the like and whose requests and replies are directed to and from the Internet 204 via a managing server 203. Once installed on the computing device 201, the browser application 202 controls the browsing and web surfing activities of each child that uses the computing device and logs the activities of each child so that the activities can be reviewed by a parent as described in more detail below. In another embodiment, the system is implemented as an add on to a browser, such as for a Firefox browser. In this embodiment, the system functionality is added to an existing browser instead of replacing the browser. This approach can be extended to Linux systems.

The system may further comprise a management server 203 such as one or more server computers in an exemplary embodiment that can be accessed by the computing device over a network, such as the Internet or other network. The computing device 201 may establish a session using the custom browser 202 and then interact with the management server 203 in order to at least: 1) update the browser application; 2) change parental settings; 3) review and approve particular web pages and/or categories of content; 4) download web pages containing the browsing activities and selected content for a particular child; 5) download content categories when the child is browsing using the browser application; and/or 6) provide product recommendations to a parent based on a child's browsing activities. The computing device 201 and management server 203 may also interact to perform other functions and operations as described below in more detail.

The management server 203 may further comprise its own web server 205 that serves web pages to the computing device 201 or downloads content to the browser application 202 among other functions. The management server 203 may also include a child-oriented content manager application 206 that manages one or more pieces of content that may be browsed by the browser application, and a database management unit 207 that manages the data in a data store 208 such as a database system. The data store 208 may store the data associated with the system such as the user data (child and parent data), content data, category data, web page content and the like. Data store 208 may also store a list of approved URL's, web pages, web sites, or other content that may be accessed by a user via the network.

Approved Content

The system maintains a database of approved content that can include web pages, web sites, video, audio, photographs, graphic images, and other retrievable content. In one embodiment, the database is defined by levels (e.g. Level 1 and Level 2). Level 1 is a review of individual media items, i.e. review of a web page, a video, a photo, or any other individual media item. Level 2 review is a review of a collection of media items, i.e. i. reviewing search results and reordering or adding items to the search results. (This is what we call categorization) or ii. reviewing a web domain, evaluating all the pages belonging to a domain, such as nick.com and determining whether every page in the domain should be approved or rejected. Level 2 is generated by incorporating websites from child friendly content sources (e.g. DMOZ, kids directories, Nickelodeon, Disney, etc.). Next, a category list was defined of the categories that are most relevant for children (entertainment, education, etc.). The category list was then populated with the collected content. In one embodiment, the categories were either populated with what was considered the best content or were populated with a ranking, ordering, or weight for each content source. In one embodiment, an editor selects a category (Zebra for example) and the system algorithmically finds the websites believed to be related to the category prioritizes the relevancy of such content based on the search algorithm. At the same time, the system fetches photos and other media content from the creative commons library at FlickR that were tagged with this category and pull videos from sites such as YouTube that met this category key word. The editor would then review the list of websites, photos and videos and pick the most relevant ones to populate a top level of results (e.g. 48 websites, 18 videos and 18 photos). The editor will also rank or order the content so that the most relevant appear in the top positions of a search for that category. The system may perform spidering in the same manner as current search engines.

The system then looks at the individual pages, sites, videos, sound files, photos, images, etc. and approves them on a one-by-one basis. This is the Level 1 category. This is for the content that was not considered to be the top level in the Level 2 exercise above. At this stage, the system may also assign category tags to the content or may rely on the Level 2 categorization.

Initially a database of approved content is assembled.
  i. from spidering and feeding the results of the spidering to editors for review (i.e. Level 1 review)

ii. from editors searching using commercial search engine or web site search capabilities for individual sites and adding individual items to the database of content iii. from editors learning of other interesting online media items (from word of mouth, TV, magazines, newspapers, etc.) and adding them individually to the database of content iv. When kids encounter pages through the KidZui browser that have not been reviewed they are sent to editors for review.

v. The system periodically re-spiders web sites and tries to determine if they have changed sufficiently to require a re-review by editors. If it determines that a re-review is required, the webpage is placed in the editorial queue for review vi. The client reports problems playing videos that do not get played to the back-end server system and those videos get placed in the editorial queue vii. The client reports pages that do not get loaded, i.e. 404s, 500s etc., and those pages are also placed in the editorial queue Category lists are defined i. editors examine popular search terms and create categories based on them. These are used in search auto-completion ii. editors examine the search results for categories and if they deem them not sufficiently strong, they adjust order of results and the search for additional content to add to the database of approved content to improve the search results iii. The system examines popular categories and search terms and regularly spiders content from those sources Another Level 1 category is blocked content that is described below.

System Operation

In one embodiment, once the system is in operation, Level 1 review gets priority over Level 2 review. Part of the Level 1 review process includes the review of "blocked pages". The term blocked pages here refers to any blocked request, including pages, sites, media files, etc. Within Level 1, a blocked page will get higher review priority over other L1 content so it is reviewed in a timely manner. There are a number of ways in which a blocked page can arise.

For example, a page of a domain is approved but the rest of the domain wasn't approved. If a child clicked on a non-approved link of that domain, the request goes to the top of the Level 1 review. Another way a blocked page arises is when a child clicks on a link on an approved page that goes to a domain that has never been reviewed or not been approved. The page is blocked and sent for review.

In the blocked page review process, the system looks at age classification of the content as well as whether the flagged content meets any of our "hot topic" flags. In one embodiment, the system defines a plurality of flags (e.g. 15-20 flags such as athletic violence, artistic nudity, cartoon violence, news, legal drugs, etc.) that can be used as filters by a parent.

Figure 3:
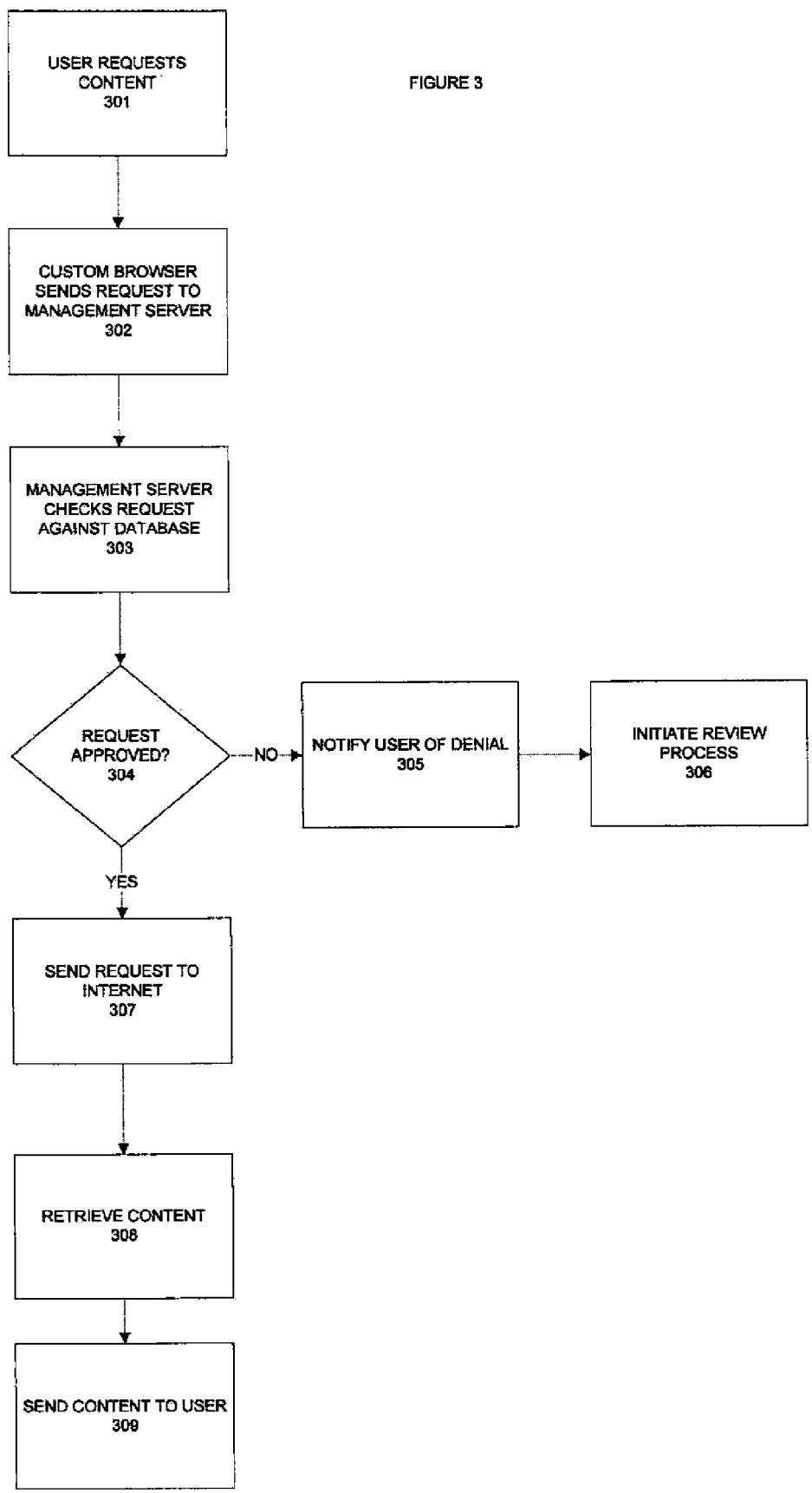
FIG. 3 is a flow diagram illustrating the handling of a content request in an embodiment of the system.

FIG. 3 illustrates a typical transaction that occurs when a user accesses the internet using the custom browser 202. At step 301 the user requests content (e.g. a web site or web page) and transmits the request from the user's computer 201. At step 302 the request is received by the management server 203. At step 303 the management server 203 checks the requested URL against a list of approved URL's in the data store 208. At decision block 304 it is determined if the URL is approved.

If the URL is not approved at step 304, the system notifies the user at step 305 that the URL is not approved. The system then initiates an editing and review operation at step 306. If the URL is approved at step 304 (meaning that there is a match with a URL on an approved list) then the management server 203 sends a request to the Internet 204 at step 307. At step 308 the management server 203 receives the requested content via internet 204. At step 309 the management server 203 responds to the user request with the requested content and transmits the content to the user through custom browser 202.

Editing Process

When a user requests content (e.g. web page URL) that has not been approved, the system initiates an editing and approval process as described in step 306 of FIG. 3. The system contemplates a plurality of human editors in combination with automated filtering to optimize the review process. Unapproved content in many cases merely the first instance of requesting otherwise safe content. One goal is to optimize the approval of such safe web pages so that in some cases, the user can be notified of the approval of that web page during the same session in which the user requested the page. Although this is not always possible, it can enhance the browsing experience.

Figure 4:
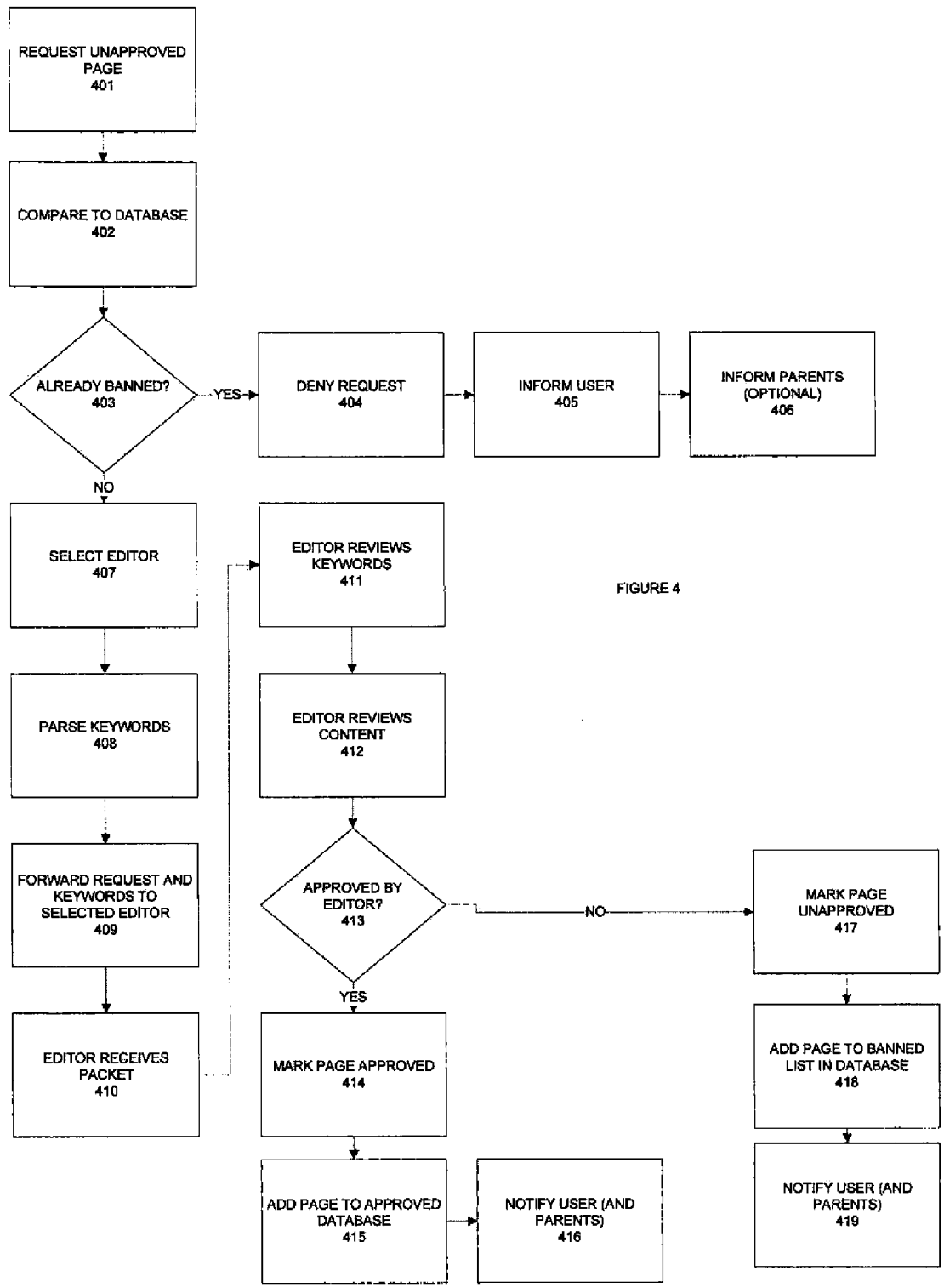
FIG. 4 is a flow diagram of one embodiment of the editing/approval process of the system.

FIG. 4 is a flow diagram of one embodiment of the editing/approval process of the system. At step 401 an unapproved web page has been requested. At step 402 the web page is compared to a list of previously unapproved web pages or domains. Some pages and domains may have already been determined to be unsafe for the target audience and need not be reviewed by a human. For example, it may be that certain adult, gambling, violent, etc. domains are never suitable for use in the system. At decision block 403 it is determined if the request is on a banned list. If so, the request is denied at step 404. At step 405 a message is sent to the user informing them of the denied request. In some circumstances, parents may have requested notification or reporting of every banned page requested by their children. If so, at step 406 the parents are notified by their method of choice (email, instant message, voice mail, text, etc.).

If the request is not currently on a banned list at decision block 403, a routing operation is performed at step 407 to select a human editor to receive a work order to review the request. At step 408 the requested content is passed through a parser and filter to determine if it contains any key words that would likely lead to a banning of the request. All found keywords are forwarded to the selected editor along with the request itself at step 409.

At step 410 the editor receives the work order, key words, and request and begins the review process. At step 411 the editor reviews the key word list. The editor may disapprove of the request based solely on the key word list depending on the contents of the list. In some cases, certain key words may be permissible in certain contexts and not permissible in others, so the editor may use judgement in determining whether to approve the site. In one embodiment, the key word list of a page is subjected to a Bayesian analysis and predictive indicator with a recommendation for approval or rejection. The actual decision of the editor is combined with the predicted recommendation to fine tune the predictive process so that the two techniques tend to converge.

The Bayesian analysis and prediction is always used in parallel to the human process and may be used as a way of quality control of the editors. This comparison can also be used to measure performance of the editors.

If the keyword list is not such as to automatically exclude the page, the editor then reviews the requested page at step 412 to determine whether it can approved. At decision block 413 it is determined if the editor has approved the page. If so, the page is approved at step 414. At step 415 the page is added to the approved list in the management server 203. At step 416 the user (and optionally parents) are notified that the page is now available.

If the editor has not approved the page at decision block 413, the editor tags the page unapproved at step 417. At step 418 the site is added to the disapproved list and at step 419 the user and optionally the parents are notified that the page is disapproved.

In one embodiment of the system, the editor has the option of approving the requested page only, or of approving the entire site from which the page is sourced. Similarly, the editor can disapprove at a page level or a site level as appropriate.

Editor Work Order Routing

Figure 5:
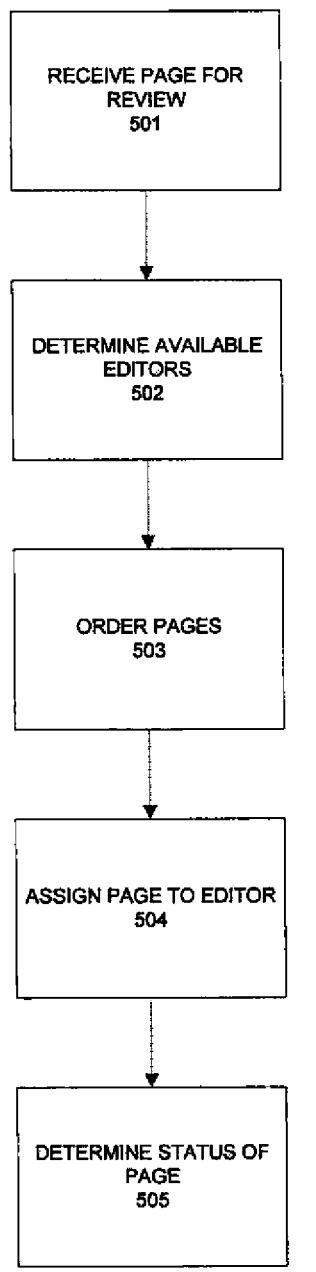
FIG. 5 is a flow diagram illustrating one embodiment of the routing of a work order to a particular editor to optimize request review.

The system maintains a roster of multiple editors in multiple time zones so that some number of editors are available throughout the day and night to handle the review of questionable requests. FIG. 5 is a flow diagram illustrating one embodiment of the routing of a work order to a particular editor to optimize request review. At step 501 the system receives a request for a web page that needs to be reviewed. At step 502 the system determines the available editors. This may be open loop based on a schedule or a closed loop based on editors signing in or otherwise indicating that they are available for reviewing content.

In one embodiment, there is an initial sorting of incoming pages to be reviewed and a sorting of which editors are assigned a page to review. The level one queue includes pages that come from a user request, referred to as "blocked pages". The system also contemplates web crawlers and spiders searching out content for review and approval (spider page). At step 503 the incoming pages are sorted into blocked, spider page, broken (if the link is not working), and skipped. A skipped page is one that an editor elected to not address when presented. In the system, blocked pages are given highest priority because a user is actively interested in going to that page. Skipped pages are next, followed by spider pages and then broken links.

The blocked pages are assigned to an editor at step 504 based on a combination of the size of an editors queue, performance, and by a round robin page assignment. If an editor has fewer pending requests than another editor, then the low queue editor will be assigned the next blocked page. In another embodiment, continuous performance metrics are maintained and the blocked page is assigned to the editor most likely to finish the page first. This can mean that an editor with a large queue but fast performance time might be assigned a blocked page over an editor with a smaller queue but longer performance times. The performance analysis takes into account nearly real-time performance metrics to assign the blocked page.

In one embodiment, one or more editors are assigned automatically to review skipped pages. The automatic assignment can be based on a number of factors. For example, it is possible for a page to be blocked even though it comes from an approved site. The popularity of all sites is ranked continuously and the blocked pages from approved sites can be given priority based on the popularity of the approved site. Those blocked pages will rise to the top of the queue for review by the editors.

The system also could prioritize blocked pages based not on popularity, but based on the rating of sites by the users. In one embodiment, the users can give a rating (e.g. a multi-scale rating system such as rating from one to ten) to a site and a blocked page from a higher ranked site will have higher editor assignment priority over a blocked page from a lower ranked site.

In another embodiment the popularity is tiered with rankings based on age and gender bands. For example, the most popular or highest ranking sites for the band including seven and eight year girls may be different than the highest ranking sites for eleven and twelve year old girls. Based on the age/gender band of the user who requests the blocked page, the appropriate ranking hierarchy is used.

At step 505 the editor can make one of four decisions about a page under review. The editor can mark the page approved, rejected, broken, or skipped. The editor marks the page with a decision and based on that decision, users and parents are notified and databases are updated accordingly.

Blocked pages are placed into a plurality of queues including a level 1 queue or a level 2 queue. The level 1 queue is populated by all blocked page requests but is continuously sorted and reordered based on some of the prioritizing criteria described above. (It should be noted that parents may be able to set stricter standards of review for their children than the default permissions of the overall system).

Domain Review

As noted above, in addition to reviewing pages, the editors can review entire domains. Domains can have one of four states in one embodiment of the system. These states are 1) approved, 2) rejected, 3) auto approve, and 4) manual approve. Approved means that the domain has been approved. Rejected means the domain has been rejected and each page from that domain is automatically rejected (Except individual pages that have previously been approved or are approved in a Level 1 review). Auto-approve means that any new page from the domain is automatically approved without review. This means that when a child clicks on a page from an auto-approved site, the page is viewable by the child but the page is still sent for review. Manual approve means that even though the domain is approved, each new page from the domain must be looked at manually before being approved. It is possible for some pages of a domain to approved and some to be rejected under the manual approve category.

It is possible for the status of domains to change over time from auto-approve to manual approve, and back again. In one embodiment, the workflow of domain review is based on user popularity of the domain under review. Statistics are kept of all users and domain visits, so that a realistic ranking of domain popularity is possible. This popularity can be based on number of visits, number of unique visits, length of time spent per user, or any combination of such metrics. After sorting by popularity, the domains are assigned to editors based on the domain state with manual approve domains having priority over auto-approve domains. Within each category, blocked requests have priority over spider requests.

Editors can approve any pages they encounter when reviewing blocked pages or during domain review. They do not need to wait for a specific request from the system spider or from a blocked page request.

Categorizing of Content

In addition to approving or rejecting web pages, the system also provides for ranking and categorizing of approved content. When an editor approves a page, the editor also can indicate the presence or absence of a plurality of categories, recommended age ranges, gender recommendations, and other categories. In one embodiment, the system seeks to identify content that is suitable for all children within a certain age range, say, for example, ages 3-11. However, although any child can access any content that has been approved, the system contemplates offering and ranking content based on age within the system.

In one embodiment, the system performs correlation and text analysis that reviews any text on a page to determine the reading comprehension level of the text. Based on that result, a recommended age range is associated with the page and stored in the management server database and/or added to metadata associated with the page. When a user performs a search request using the custom browser, the results are presented so that the most relevant results that are at or near the age level of the searcher are presented first. Pages are also assigned to age ranges based on the popularity ranking of each page by the respective age ranges. Search results may be presented in order of relevance to users following the editorial selections if there are any, with the exception that some sites may be boosted in the order based on user popularity.

In another embodiment, certain topics that are approved for the system may be limited within the system to certain age groups. The system also looks to the ability to navigate the content with clicks and graphics versus the need to read linking information as a consideration for assigning an age range to the content. The amount of text versus graphics on a page is another metric that is used to assign age ranges to web pages. Usually, the greater the amount of graphics to text, the lower the age range assignment.

Other attributes can be associated with the content or page. The page itself may include metadata that can be parsed by the system and used to categorize the content appropriately. For example, the page may be classified as related to a particular kind of animal, and/or related to subjects such as math, science, history, etc. Each attribute can be indicated by simple presence absence in one embodiment. In another embodiment, the system may assign a weighted score to each attribute based on meta data associated with the page or by a manual review and ranking of the content by and editor.

The system can also assign attributes and characteristics based on popularity of the page by other users in the system. The system has demographic information about all the users of the system. For example, if a particular page is most popular among 7-8 year old boys, then the attributes of that page will be such as to reflect that tendency.

The system can also associate characteristics to pages based on individual user preferences. A histogram of user activity is maintained for each user. For each site or page visited by the user, the system tracks all attributes and characteristics associated with the page and populates the user's histogram accordingly. When that user does a search, search results can be ranked based on the user's own history, then by age group, and then by other characteristics as appropriate.

Homework Assistance

It is anticipated that one use for the child oriented browser of the system is to provide a method for children to access network information to assist in helping with school assignments or other learning assignments. Of course a child can find information related to an assignment just be a general search of data. However, the system contemplates the characterizing of content in a way that would more clearly and directly aid in homework assignments.

In one embodiment, the system includes assigning a characteristic or attribute that identifies a grade level and subject for which a page or other content would be helpful.

In one embodiment, the user can set a filter on a search engine in the custom browser called "homework helper" that will ignore certain related categories that would normally appear in the search. The filter will limit the search to the pages from the highest scoring category for that search request assuming that the high scoring category is the most useful for the search.

In another embodiment, homework search mode uses known information (age band, expected grade level) of the searcher to fine tune the search to results most related to that category. The user may also be asked questions related to the type of class for which help is being requested (e.g. math, science, history, etc) and the system takes advantage of characteristics associated with pages to find the most useful. The system can also take advantage of prior user feedback on the helpfulness of pages to homework assignments to rank and sort search results for homework assistance. That feedback is also sorted by age and gender as well as appropriate.

Because the system can tag each page with characteristics and statistical data, the usefulness of pages in assisting with class assignments can be gauged and used appropriately.

Thus, a method and apparatus for editing, ranking, filtering, and approving content has been described.

What is claimed is:

1. A method of performing a review process of a request for content by a user comprising:
    identifying a domain associated with the request;
    approving the request when the domain is an approved domain; rejecting the request when the domain is a rejected domain;
    comparing the request to a database of banned requests when the domain is not an approved or rejected domain;
    denying the request when the request is found in the database of banned requests;
    notifying the user of the denial of the request;
    parsing the content of the request to identify keywords when the request is not found in the database of banned requests;
    comparing the keywords to a dictionary of banned terms;
    denying the request when a threshold number of keywords are found in the dictionary of banned terms and
    assigning the request to one of a plurality of editors when the threshold number of keywords are not found in the dictionary of banned terms.

2. The method of claim 1 wherein the step of assigning the request to one of the plurality of editors is based on characteristics associated with the request.

3. The method of claim 1 wherein a characteristic of the request is the source of the request.

4. The method of claim 1 wherein a characteristic of the request is the popularity of a provider of the content of the request.

* * * * *